(12) United States Patent
Appireddygari Venkataramana et al.

(10) Patent No.: US 11,086,552 B2
(45) Date of Patent: Aug. 10, 2021

(54) SYSTEM AND METHOD FOR SELECTIVE BACKUP PROMOTION USING A DYNAMICALLY RESERVED MEMORY REGISTER

(71) Applicant: EMC IP Holding Company LLC, Hopkinton, MA (US)

(72) Inventors: Mahesh Reddy Appireddygari Venkataramana, Bangalore (IN); Swaroop Shankar D. H., Bangalore (IN); Shelesh Chopra, Bangalore (IN); Matthew Dickey Buchman, Bangalore (IN); Asif Khan, Bangalore (IN); Sunil K. Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/396,538

(22) Filed: Apr. 26, 2019

(65) Prior Publication Data

US 2020/0341640 A1 Oct. 29, 2020

(51) Int. Cl.
*G06F 3/06* (2006.01)
*G06F 12/0802* (2016.01)

(52) U.S. Cl.
CPC .......... *G06F 3/065* (2013.01); *G06F 3/0619* (2013.01); *G06F 3/0659* (2013.01); *G06F 3/0673* (2013.01); *G06F 12/0802* (2013.01); *G06F 2212/1032* (2013.01)

(58) Field of Classification Search
CPC ...... G06F 3/065; G06F 3/0673; G06F 3/0659; G06F 3/0619; G06F 12/0802; G06F 2212/1032
See application file for complete search history.

(56) References Cited

U.S. PATENT DOCUMENTS

| 2004/0263519 | A1* | 12/2004 | Andrews | G06F 15/7846 345/502 |
| 2007/0276885 | A1* | 11/2007 | Valiyaparambil | G06F 11/1451 |
| 2014/0068180 | A1* | 3/2014 | Hsieh | G06F 11/3476 711/113 |
| 2017/0010941 | A1* | 1/2017 | Shimada | G06F 11/00 |

\* cited by examiner

*Primary Examiner* — Tasnima Matin
(74) *Attorney, Agent, or Firm* — Chamberlain, Hrdlicka, White, Williams & Aughtry

(57) ABSTRACT

A method for managing backups includes obtaining a plurality of parameters for a data item, filtering the plurality of parameters to obtain a plurality of filtered parameters, evaluating each filtered parameter of the plurality of filtered parameters to obtain a plurality of evaluated parameters, updating a promotion parameter register based on the plurality of evaluated parameters, and processing a backup request using the promotion parameter register, wherein the backup request specifies the data item.

20 Claims, 8 Drawing Sheets

SYSTEM AND METHOD FOR SELECTIVE BACKUP PROMOTION USING A DYNAMICALLY RESERVED MEMORY REGISTER

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing backups in accordance with one or more embodiments of the invention. The method includes obtaining a plurality of parameters for a data item, filtering the plurality of parameters to obtain a plurality of filtered parameters, evaluating each filtered parameter of the plurality of filtered parameters to obtain a plurality of evaluated parameters, updating a promotion parameter register based on the plurality of evaluated parameters, and processing a backup request using the promotion parameter register, wherein the backup request specifies the data item.

In one aspect, a non-transitory computer readable medium in accordance with one or more embodiments of the invention includes computer readable program code, which when executed by a computer processor enables the computer processor to perform a method for managing backups. The method includes obtaining a plurality of parameters for a data item, filtering the plurality of parameters to obtain a plurality of filtered parameters, evaluating each filtered parameter of the plurality of filtered parameters to obtain a plurality of evaluated parameters, updating a promotion parameter register based on the plurality of evaluated parameters, and processing a backup request using the promotion parameter register, wherein the backup request specifies the data item.

In one aspect, a system in accordance with one or more embodiments of the invention includes a processor and memory that includes instructions, which when executed by the processor, perform a method for managing backups. The method includes obtaining a plurality of parameters for a data item, filtering the plurality of parameters to obtain a plurality of filtered parameters, evaluating each filtered parameter of the plurality of filtered parameters to obtain a plurality of evaluated parameters, updating a promotion parameter register based on the plurality of evaluated parameters, and processing a backup request using the promotion parameter register, wherein the backup request specifies the data item.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing backup operations. More specifically, embodiments of the invention relate to a method for identifying data items to be promoted from an incremental backup to a full backup. Embodiments of the invention may obtain parameters associated with backing up the data item and determine whether the parameters cause a promotion of the data item from an incremental to a full backup. Embodiments of the invention may utilize a promotion parameter register to store bits, each associated with a particular data item. Each bit may specify whether a data item is (or is not) to be promoted. The promotion parameter register may be updated based on the determinations of the obtained parameters.

Figure 1A:
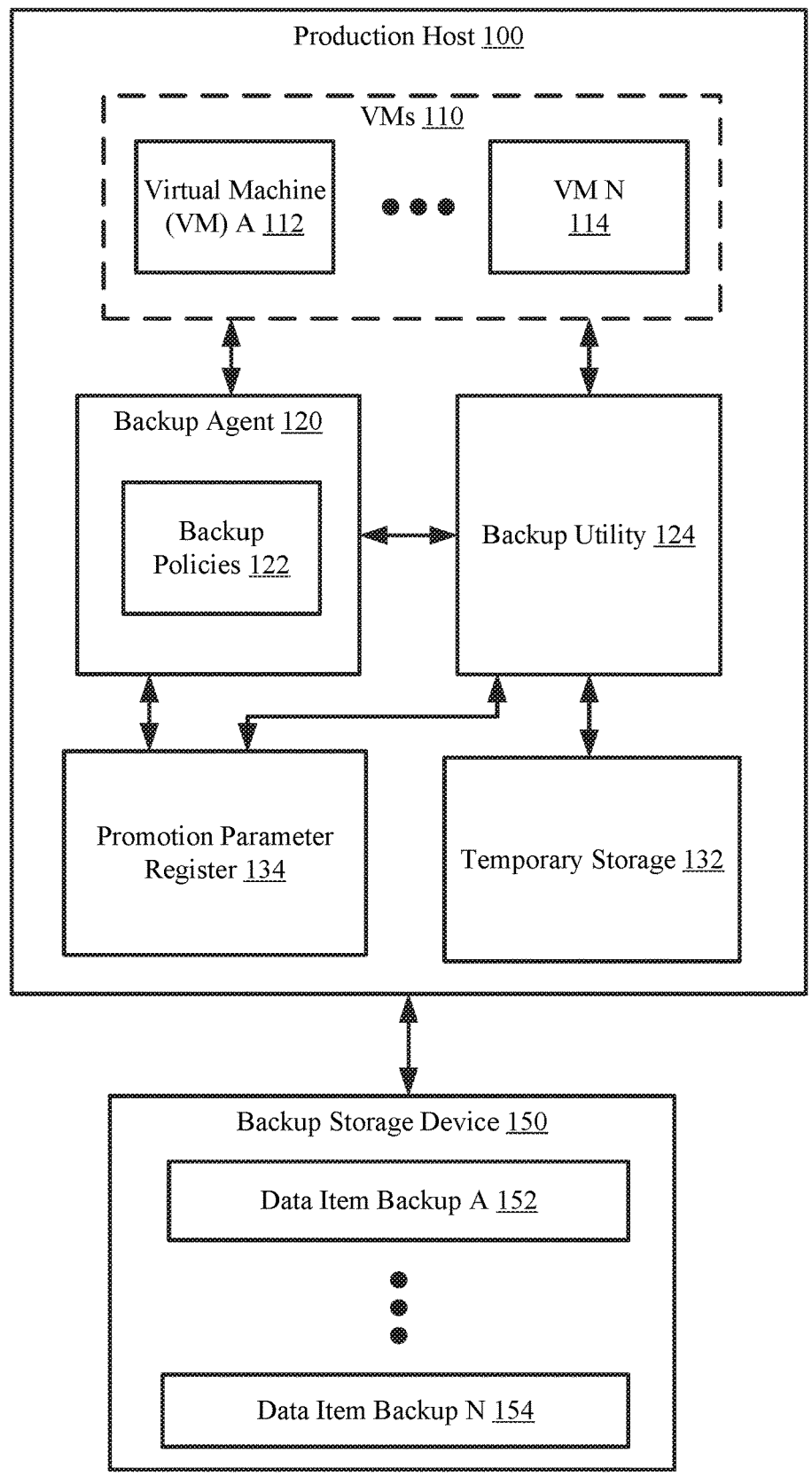
FIG. 1A shows a diagram of a system in accordance with one or more embodiments of the invention.

FIG. 1A shows a diagram of a system in accordance with one or more embodiments of the invention. The system includes a production host (100) and a backup storage device (150). The production host may include virtual machines (110), a backup agent (120), a backup utility (130), temporary storage (132), and a promotion parameter register (134). The backup storage device (150) may include data item backups (152, 154). The system may include additional, fewer, and/or different components without departing from the invention. Each component may be operably connected via any combination of wired and/or wireless connections. Each component illustrated in FIG. 1A is discussed below.

In one or more embodiments of the invention, the production host (100) hosts virtual machines (VMs) (110). The virtual machines (110) may be logical entities executed using computing resources (not shown) of the production host (100). Each of the virtual machines (110) may be performing similar or different processes. In one or more embodiments of the invention, the virtual machines (110) provide services to users, e.g., clients (not shown). For example, the virtual machines (110) may host instances of databases, email servers, and/or other applications. The virtual machines (110) may host other types of applications without departing from the invention.

In one or more of embodiments of the invention, the virtual machines (110) are implemented as computer instructions, e.g., computer code, stored on a persistent storage (e.g., on a production host (100)) that when executed by a processor(s) of the production host (100) cause the production host (100) to provide the functionality of the virtual machines (110) described throughout this application.

In one or more embodiments of the invention, the backup agent (120) is a device that initiates backups of data items. A data item may be, for example, a VM (112, 114). The backup agent (120) may initiate a backup of a data item by implementing backup policies (122). The backup policies (122) may be entities that specify when to back up a data item and what type of backup (e.g., an incremental backup or a full backup) to perform on the virtual machines.

In one or more embodiments of the invention, a data item is a collection of data to be backed up. The data item may be all data associated with, for example, a virtual machine, an application operating in a virtual machine, a database managed by a virtual machine, and/or other entity without departing from the invention.

In one or more embodiments of the invention, the backup policies (112) are data structures that include entries. The entries may specify, for example, a data item to be backed up, a schedule for backing up the data items, a type of backup (discussed below), and/or other policies for backing up the data items without departing from the invention. A schedule may include, for example, a period of time in which to back up the data item (e.g., every 24 hours, every 7 days, every Sunday, etc.). The schedule may specify other points in time without departing from the invention.

In one or more embodiments of the invention, an entry of the backup policies (112) may specify a type of backup to perform on the data item. A type of backup may include an incremental or a full backup. In one or more embodiments of the invention, an incremental backup is a backup of data associated with a data item that was modified during a time period after a previous backup (which may itself be an incremental or full backup). In contrast, a full backup is a backup of all data associated with the data item.

In one or more embodiments of the invention, the backup agent (120) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (120) described throughout this application and/or all, or a portion thereof, of the method illustrated in FIG. 2C.

Figure 2A:
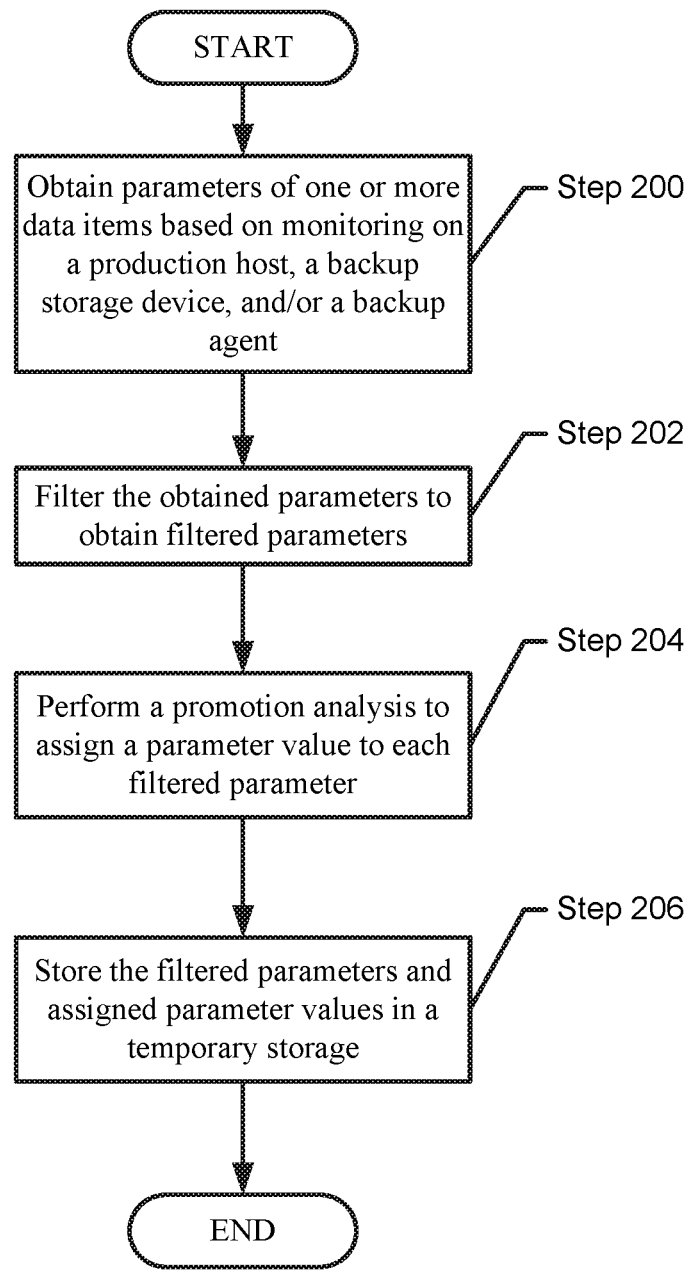
FIG. 2A shows a flowchart for processing parameters in accordance with one or more embodiments of the invention.
Figure 2B:
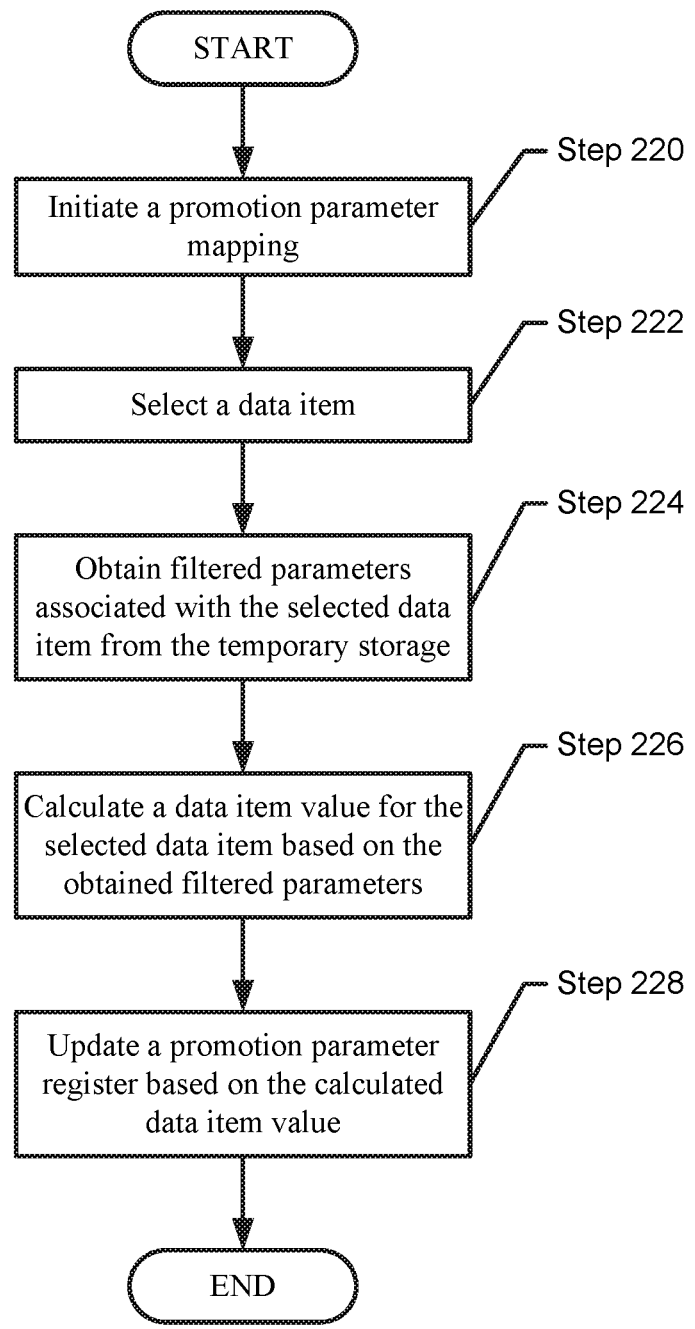
FIG. 2B shows a flowchart for managing a promotion parameter register in accordance with one or more embodiments of the invention.
Figure 2C:
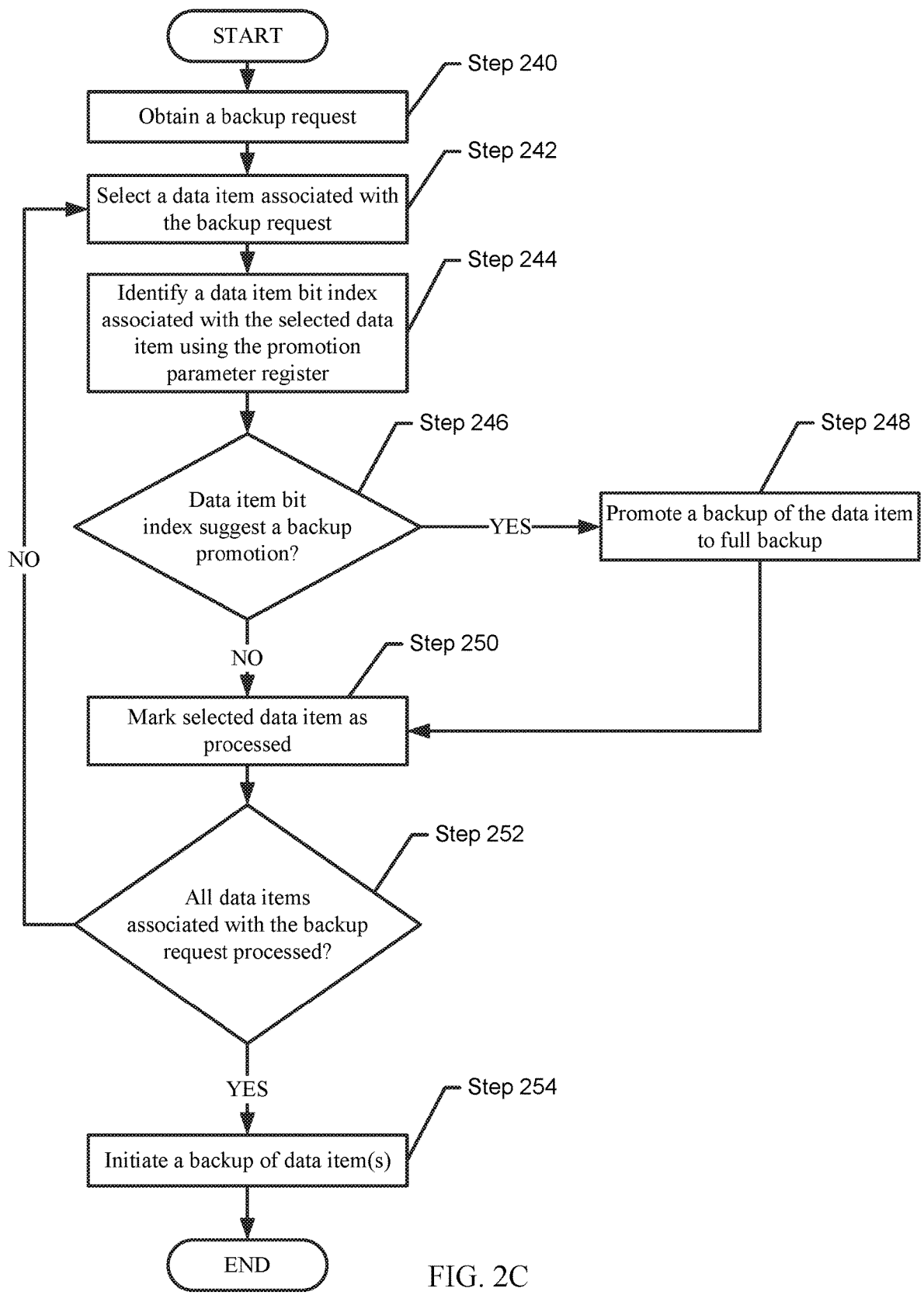
FIG. 2C shows a flowchart for processing backup requests in accordance with one or more embodiments of the invention.

In one or more embodiments of the invention, the backup agent (120) is implemented as computer instructions, e.g., computer code, stored on a persistent storage that when executed by a processor of the production host (100) to provide the functionality of the backup agent (120) described throughout the application and/or all, or a portion thereof, of the method illustrated in FIG. 2C.

In one or more embodiments of the invention, the backup utility (130) monitors data of other entities (e.g., the backup agent (120), the VMs (110), the backup storage device (150), etc.) to determine whether to promote a data item. As used herein, to promote a data item refers to making a determination to perform a full backup of a data item as opposed to performing an incremental backup as specified by the backup policies (112).

In one or more embodiments of the invention, the backup utility (130) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup utility (130) described throughout this application and/or all, or a portion thereof, of the methods illustrated in FIGS. 2A-2C.

Figure 1B:
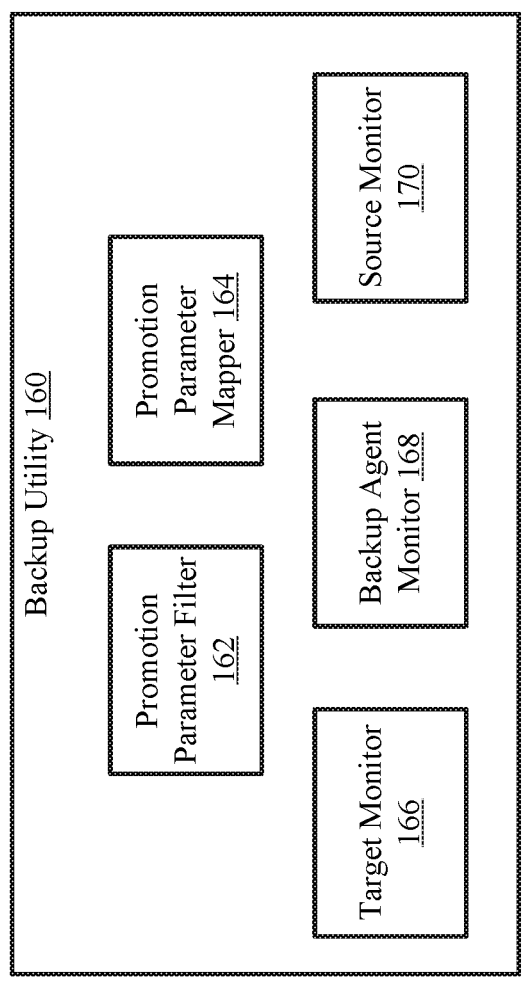
FIG. 1B shows a diagram of a backup utility in accordance with one or more embodiments of the invention.

In one or more embodiments of the invention, the backup utility (130) is implemented as computer instructions, e.g., computer code, stored on a persistent storage that when executed by a processor of the production host (100) to provide the functionality of the backup utility (130) described throughout the application and/or all, or a portion thereof, of the methods illustrated in FIGS. 2A-2C. For additional details regarding the backup utility (130), see, e.g., FIG. 1B.

To perform the aforementioned functionality, the backup utility may utilize a temporary storage (132). In one or more embodiments of the invention, the temporary storage (132) stores one or more parameters associated with backing up the data items. The parameters may be filtered and categorized by the backup utility (130) prior to being stored in the temporary storage.

In one or more embodiments of the invention, the temporary storage (132) is volatile memory. As used herein, volatile memory refers to a type of storage where data is not maintained after the storage loses power. The volatile memory may be easily accessible by the components of the production host (100). The volatile memory may be, for example, level 2 (L2) cache. Other volatile memory may be used without departing from the invention.

In one or more embodiments of the invention, the promotion parameter register (134) is a data structure that includes a number of bits. Each bit corresponds to a data item. The promotion parameter register (134) may be updated by the backup utility (130) to specify data items that are to be promoted. Further, the promotion parameter register (134) may be used by the backup agent (120) during a backup operation to determine whether a data item is to be promoted based on the updates from the backup utility (130). For additional details regarding the promotion parameter register, see, e.g., FIG. 1C.

Figure 4:
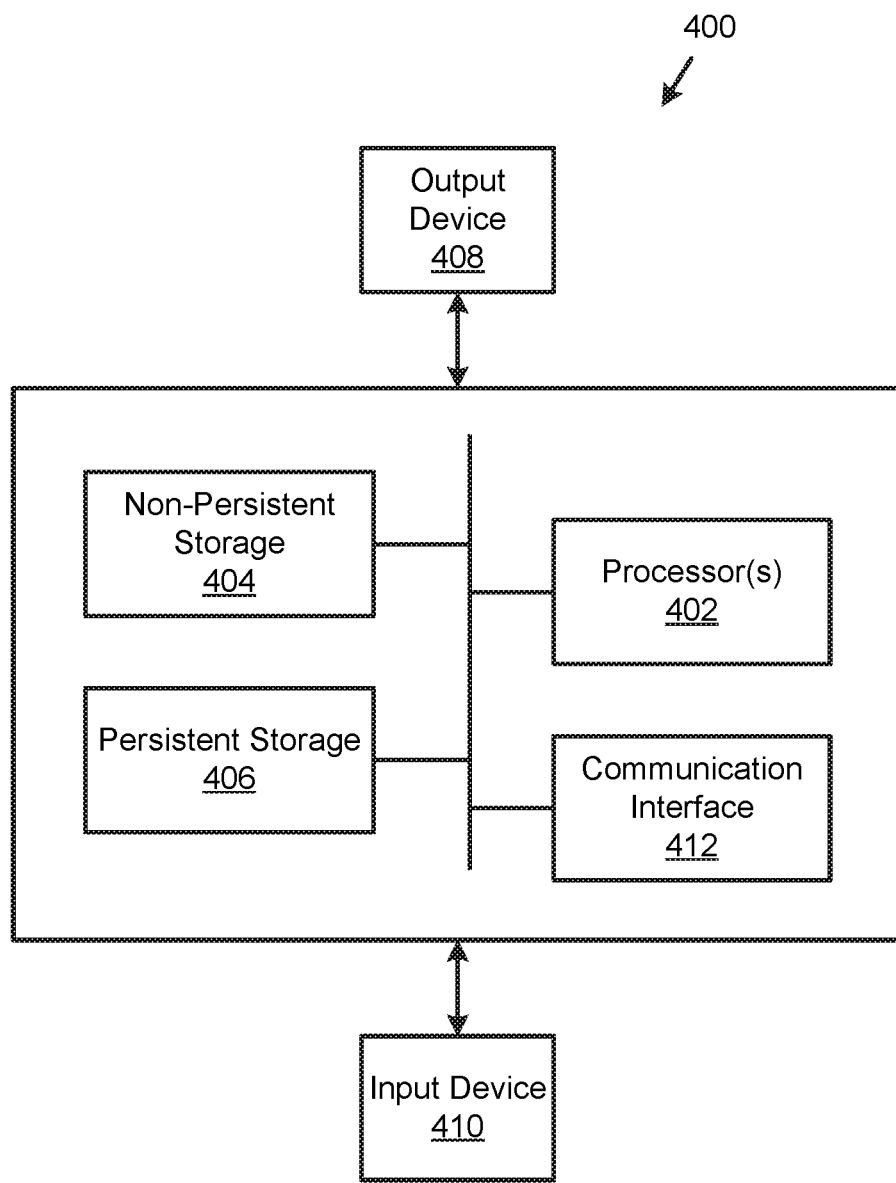
FIG. 4 shows a diagram of a computing device in accordance with one or more embodiments of the invention.

In one or more embodiments of the invention, the production host (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (100) described throughout this application.

In one or more embodiments of the invention, the production host (100) is implemented as a logical device. The logical device may utilize the computing resources of any number of computing devices and thereby provide the functionality of the production host (100) described throughout this application.

In one or more embodiments of the invention, the backup storage device (150) stores data item backups (152, 154). In one or more embodiments of the invention, a data item backup (152, 154) is a data structure that includes a copy of data associated with a data item. The data item backups (152, 154) may be generated by the backup agent (120).

In one or more embodiments of the invention, a data item backup (152, 154) may be a full backup or an incremental backup. A full backup may include all data necessary to recover the data item to a previous point in time. To recover a data item to a point in time associated with a full backup, no additional backups may be necessary. In contrast, an incremental backup may not include all data necessary to recover the data item. To recover a data item to a point in time associated with an incremental backup, additional backups may be necessary in addition to the incremental backup.

In one or more embodiments of the invention, the backup storage device (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application.

In one or more embodiments of the invention, the backup storage device (150) is implemented as a logical device. The logical device may utilize the computing resources of any number of computing devices and thereby provide the functionality of the backup storage device (150) described throughout this application.

FIG. 1B shows a diagram of a backup utility in accordance with one or more embodiments of the invention. The backup utility (160) may be similar to the backup utility (130) discussed above. As discussed above, the backup utility (160) monitors data (e.g., parameters) of entities and determines whether to promote data items based on the monitored parameters. To perform the aforementioned functionality, the backup utility may include a promotion parameter filter (162), a promotion parameter mapper (164), a target monitor (166), a backup agent monitor (168), and a source monitor (170). The backup utility may include additional, fewer, and/or different components without departing from the invention. The components of the backup utility (160) illustrated in FIG. 1B are discussed below.

In one or more embodiments of the invention, the promotion parameter filter (162) processes obtained parameters. The promotion parameter filter may process the obtained parameters by identifying obtained parameters and determining whether an obtained parameter may potentially cause a promotion of a data item. Further, parameters that are determined to potentially cause a promotion may be classified based on a type of parameter. The promotion parameter filter (162) may store the classified parameters in a temporary storage (e.g., 132, FIG. 1A).

In one or more embodiments of the invention, the promotion parameter filter (162) further processes the parameters by classifying each parameter into one of three categories: (i) an event, (ii) a condition, or (ii) a policy. An event may specify an occurrence identified by an entity monitored by the backup utility (160). An event may be, for example, an entity is rebooted, a new data item is introduced to the system, a failover of a data item is detected, etc. A condition may specify a state of an entity, of a component of an entity, or of a data item. A state may be, for example, a configuration setting of the entity, component, or data item. An obtained parameter that is classified as a policy may be, for example, a backup policy stored by the backup agent.

In one or more embodiments of the invention, the promotion parameter filter (162) processes the obtained parameters via the method illustrated in FIG. 2A. The promotion parameter filter (162) may process the obtained parameters via other methods without departing from the invention.

In one or more embodiments of the invention, the promotion parameter mapper (164) determines whether a parameter is to be promoted based on the parameters processed. The promotion parameter mapper obtains processed parameters associated with each data item from the temporary storage and determines whether the data item is to be promoted.

In one or more embodiments of the invention, the promotion parameter mapper (164) processes the obtained parameters via the method illustrated in FIG. 2B. The promotion parameter mapper (164) may process the obtained parameters via other methods without departing from the invention.

In one or more embodiments of the invention, the target monitor (166) monitors a backup storage device (e.g., 150, FIG. 1A). The target monitor (166) obtains parameters (e.g., events or conditions) from the backup storage device. The target monitor (166) may obtain the parameters by sending requests periodically to the backup storage device for changes to a state of the backup storage device and/or events that affect the backup storage device. In one or more embodiments of the invention, the backup storage device sends a notification to the target monitor (166) that specifies a parameter in response to an event occurring or in response to a change to the state of the backup storage device.

In one or more embodiments of the invention, the backup agent monitor (168) monitors a backup agent (e.g., 120, FIG. 1A). The backup agent monitor (168) obtains parameters (e.g., events, conditions, or policies) from the backup agent. The backup agent monitor (168) may obtain the parameters by sending requests periodically to the backup agent for changes to a state of the backup agent, changes to events that affect the backup agent, and/or changes to backup policies. In one or more embodiments of the invention, the backup agent sends a notification to the backup agent monitor (168) that specifies a parameter in response to an event occurring, in response to a change to the state of the backup agent, or in response to a new backup policy or a change to an existing backup policy.

In one or more embodiments of the invention, the source monitor (170) monitors data items. As discussed above, a data item may be a virtual machine, an application executing as part of the virtual machine, or a database managed by a production host. The source monitor (170) obtains parameters (e.g., events or conditions) from the production host hosting the data items. The source monitor (170) may obtain the parameters by sending requests periodically to the production host for changes to a state of the data items and/or events that affect the data items. In one or more embodiments of the invention, the production host sends a notification to the source monitor (170) that specifies a parameter in response to an event occurring or in response to a change to the state of the data item.

Figure 1C:
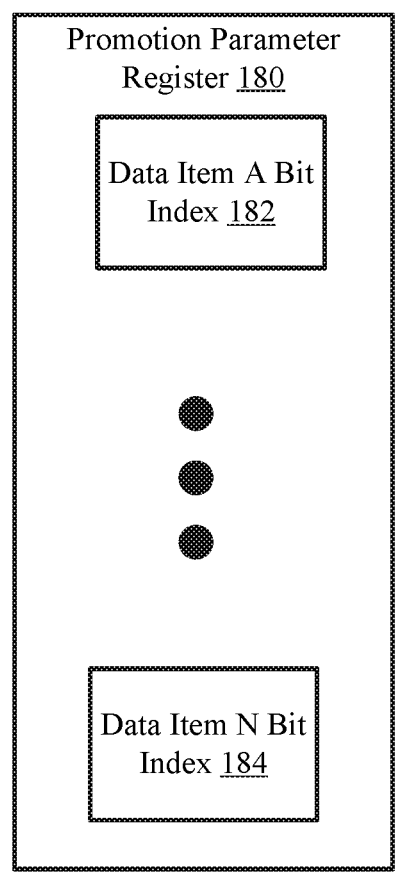
FIG. 1C shows a diagram of a promotion parameter register in accordance with one or more embodiments of the invention.

FIG. 1C shows a diagram of a promotion parameter register. The promotion parameter register (180) may be similar to the promotion parameter register (134, FIG. 1A) discussed above. The promotion parameter register (180) may be implemented as a memory register that includes one or more data item bits i (182, 184). Each data item bit, which may be identified by a numeric number, e.g., bit location 0, bit location 1, etc. is mapped to a specific data item.

In one or more embodiments of the invention, a data item bit is a single-bit index that is updated by a promotion parameter mapper (e.g., 164, FIG. 1B). The promotion parameter mapper may include a mapping that associates each data item bit (182, 184) to the corresponding data item. In one or more embodiments of the invention, a data item bit is a value of "true" or "false." The value may be represented by a 1 for "true" or 0 for "false"

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for processing parameters in accordance with one or more embodiments of the invention. The method shown in FIG. 2A may be performed by, for example, a promotion parameter filter (162, FIG. 1B). Other components of the system illustrated in FIG. 1B may perform the method of FIG. 2A without departing from the invention.

Turning to FIG. 2A, in step 200, parameters of one or more data items are obtained based on monitoring on a production host, a backup storage device, and/or a backup agent. In one or more embodiments of the invention, the monitoring may be performed by a source monitor, a target monitor, and/or a backup agent monitor. The parameters are obtained by the promotion parameter filter from the corresponding monitor (i.e., the parameters of a production host are obtained from the source monitor, the parameters of the backup storage device are obtained from the target monitor, the parameters of the backup agent are obtained from the backup agent monitor, etc.).

In one or more embodiments of the invention, the parameters are obtained as the respective monitor obtains the parameters. In other words, the parameters obtain a parameter from a monitor (e.g., a source monitor, a target monitor, or a backup agent monitor) in response to the monitor obtaining the parameter from the corresponding entity.

In one or more embodiments of the invention, the promotion parameter filter obtains parameters based on a periodic polling of the monitors by the promotion parameter filter. The promotion parameter filter sends a parameter request to each monitor to obtain the parameters from each monitor.

In step 202, the obtained parameters are filtered to obtain filtered parameters. In one or more embodiments of the invention, each of the obtained parameters is filtered by making a determination about whether the filtered parameter potentially affects a promotion of a data item. In one embodiment of the invention, a parameter is selected, i.e., becomes a filtered parameter, if the parameter has been previously identified as a parameter that may result in data loss and, as a result, should be further analyzed for the purpose of determining whether it triggers the promotion of backup to a full backup. In one or more embodiments of the invention, the promotion parameter filter makes the determination based on predefined criteria. The predefined criteria may specify, for example, a key word specified in the parameter. Examples of keywords to be searched include "reboot," "database failover," "volume extended," "volume shrinked," "database added," "write tracker re-initialized," "bitmap error," etc.

In one or more embodiments of the invention, the obtained parameters are further filtered by categorizing the parameters based on a type of parameter. The parameters may be categorized as, for example, an event, a condition, or a policy. The promotion parameter filter categorizes the parameter based on the content of the parameter.

In step 204, a promotion analysis is performed on the filtered parameters to assign a parameter value to each filtered parameter. In one or more embodiments of the invention, a parameter value may be either "true" or "false." The parameter may be associated with a parameter value (e.g., "true," or "false". The parameter value is generated by further analyzing the content of the filtered parameter and determining whether the filtered parameter causes a data item to be promoted.

For example, a key word identified in step 202 (e.g., the word "reboot") for a filtered parameter is analyzed to the entity that it describes. If the filtered parameter specifies an entity is rebooted, then a determination may be made about whether the entity rebooting causes data loss to a data item, which would then trigger the need to promote the backup to a full backup. If a determination is made that the filtered parameter would result in data loss then the parameter value would be set to true; otherwise, it would be set of false. The determination is used to assign a parameter value to the filtered parameter.

In one or more embodiments of the invention, the filtered parameter is tagged with a data item associated with the filtered parameter. The filtered parameter may specify a data item and/or an entity associated with a data item (e.g., a virtual machine under which a data item is operating). The data item may be identified by the promotion parameter mapper, and a data item identifier may be tagged to the filtered parameter.

In step 206, the filtered parameters and assigned parameter values are stored in temporary storage. The promotion parameter filter may store the filtered parameter in the temporary storage based on the category of the filtered parameter (e.g., based on event, condition, and policy).

FIG. 2B shows a flowchart for managing a promotion parameter register in accordance with one or more embodiments of the invention. The method shown in FIG. 2B may be performed by, for example, a promotion parameter mapper (164, FIG. 1B). Other components of the system illustrated in FIG. 1B may perform the method of FIG. 2B without departing from the invention.

In step 220, a promotion parameter mapping is initiated. In one or more embodiments of the invention, the promotion parameter mapping is initiated based on a trigger event. In one or more embodiments of the invention, the trigger event is a notification obtained by the promotion parameter mapper that specifies an occurrence that causes the promotion parameter mapping to update a promotion parameter register. Additionally, the trigger event may specify one or more data items.

An occurrence may be a periodic occurrence (i.e., repeating after predetermined units of time), or an external occurrence. An external occurrence may be a request by an external entity (i.e., a virtual machine) to determine whether one or more data items associated with the entity is to be promoted, a notification that a production host was rebooted, etc.

In step 222, a data item is selected. In one or more embodiments of the invention, the data item is selected from the trigger event that triggers the promotion parameter mapping to perform the method of FIG. 2B.

In step 224, filtered parameters associated with the selected data item (also referred to as evaluated parameters) are obtained from the temporary storage. In one or more embodiments of the invention, the filtered parameters are obtained by searching for filtered parameters stored in the temporary storage that are tagged with an identified of the selected data item. In one or more embodiments of the invention, by using the available temporary storage, the filter parameters are efficiently stored without requiring significant overhead or reserved storage to store the filtered parameters.

In step 226, a data item value is calculated for the selected data item based on the obtained filtered parameters. In one or more embodiments of the invention, the data item value is calculated by identifying a parameter value for each obtained filtered parameter and applying an "or" function to the parameter values to calculate a data item value. As used herein, the "or" function refers to a logical operation where each input is valued as either "true" or "false" and produces a "true" result if one or more inputs is a "true" and produces a "false" value otherwise. The "or" function is applied to the parameter values to obtain a result. The result value may be the data item value.

In step 228, the promotion parameter register is updated based on the calculated data item value. In one or more embodiments of the invention, the promotion parameter register is updated by identifying a data item bit that corresponds to the selected data item and determining whether the identified data item bit matches the data item value. If the identified data bit index does not match the data item value, the identified data bit index is updated with the data item value; otherwise, the data item bit is not modified.

In one or more embodiments of the invention, filtered parameters stores in the temporary storage are removed from the temporary storage after the filtered parameters have been used to update the promotion parameter register. In this manner, fewer computing resources are used to store the filtered parameters and to obtain filtered parameters for a promotion parameter mapping.

By encoding whether to promote a backup associated with a given data item in the promotion parameter register, embodiments of the invention provide a low latency mechanism that allows the backup agents to rapidly determine whether (or not) to promote a given backup to a full backup.

FIG. 2C shows a flowchart for processing a backup request in accordance with one or more embodiments of the invention. The method shown in FIG. 2C may be performed by, for example, a promotion parameter mapper (164, FIG. 1B). Other components of the system illustrated in FIG. 1B may perform the method of FIG. 2C without departing from the invention.

In step 240, a backup request is obtained. The backup request may be obtained from a backup agent (e.g., 120, FIG. 1A). The backup request may specify one or more data items to be backed up. Further, the backup request may specify a type of backup to generate for the data item (i.e., a full backup or an incremental backup).

In step 242, a data item associated with the backup request is selected.

In step 244, a data item bit associated with the selected data item is identified. The promotion parameter mapper may identify the data item bit using a mapping that associates each data item bit of the promotion parameter register to a data item.

In step 246, a determination is made about whether the identified data item bit suggests a backup promotion. In one or more embodiments of the invention, the data item bit suggests a backup promotion if the following criteria are met: (i) the backup request specifies performing an incremental backup of the selected data item, and (ii), the identified data item bit has a "true" value. If the identified data item bit suggests a backup promotion, the method proceeds to step 248; otherwise, the method proceeds to step 250.

In step 248, a backup of the data item is promoted to full backup. The promotion parameter may update the backup request based on the promotion.

In step 250, the selected data item is marked as processed.

In step 252, a determination is made about whether all data items associated with the backup request are processed. If all data items are processed, the method proceeds to step 254; otherwise, the method proceeds to step 242.

In step 254, a backup of data items associated with the backup request is initiated. In one or more embodiments of the invention, the backup is initiated by sending a notification to the backup agent that specifies any data items that are to be backed up. The backup agent may update back up the data items based on the notification. In other words, any data items specified in the notification to be promoted may be backed up as a full backup by the backup agent.

Example

Figure 3:
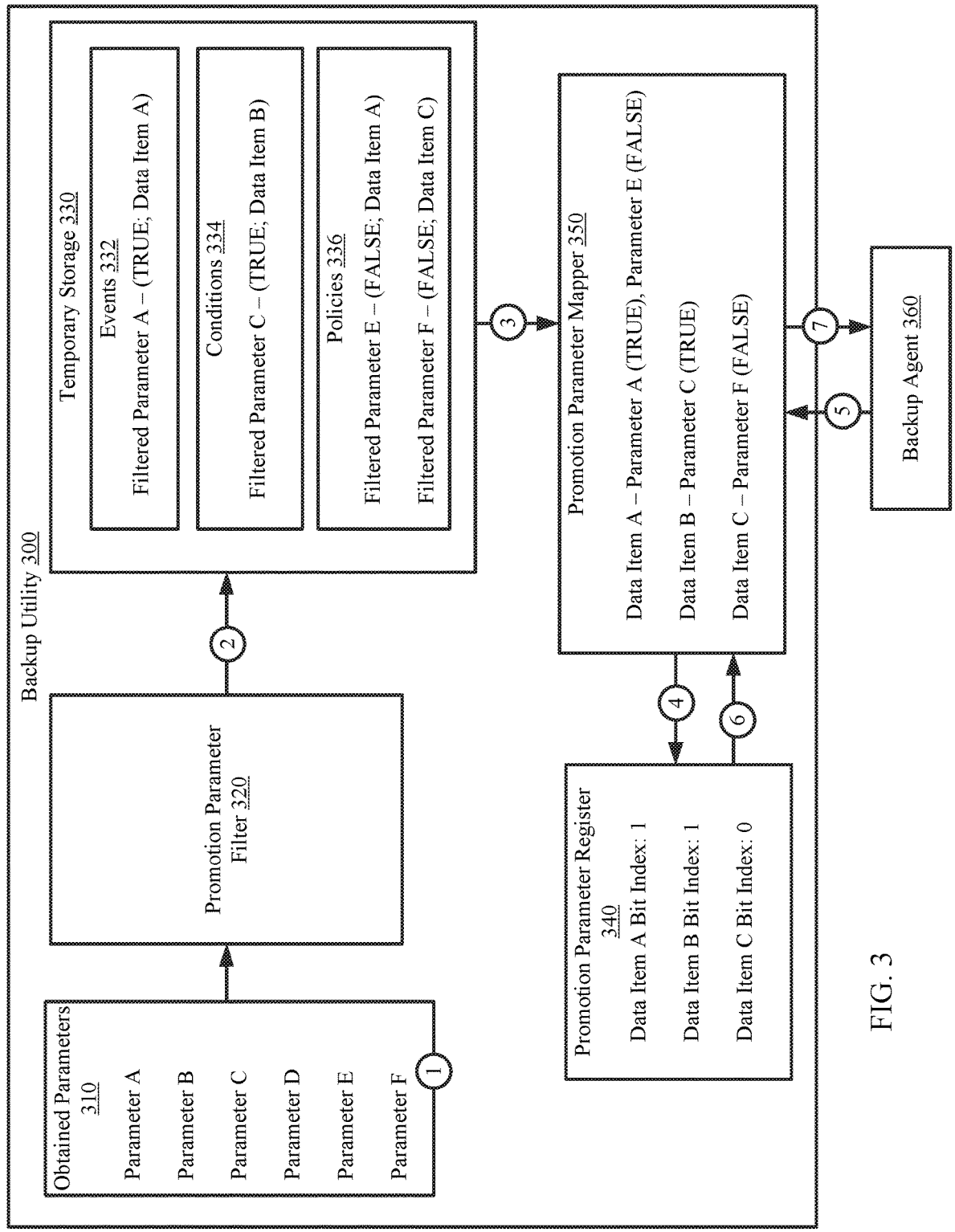
FIG. 3 shows an example in accordance with one or more embodiments of the invention.

The following section describes an example. The example, illustrated in FIG. 3, is not intended to limit the invention. Turning to the example, consider a scenario in which a backup utility obtains a number of parameters (310) [1]. The backup utility may obtain the parameters (310) from a backup agent, a backup storage device, and/or a production host on which the backup utility is executing.

A promotion parameter filter (320) may perform the method of FIG. 2A to process the obtained parameters (310) to obtain filtered parameters. The process includes applying a predetermined search function to determine whether the each parameter may potentially cause a data item to be promoted. The promotion parameter filter may determine that between parameters A-F, only parameters A, C, E, and F fall within the search function.

The promotion parameter filter may further apply a more advanced function to further determine whether the filtered parameters necessitate the promotion of a backup associated with a data item. Each filtered parameter is tagged with a data item identifier (e.g., Data Item A, Data Item B, Data Item C) that the filtered parameter may promote. Further, based on the application of the advanced function, the filtered parameter is assigned a parameter value of "true" if the filtered parameter promotes the data item and a parameter value of "false" if the filtered parameter does not promote the data item.

The promotion parameter filter may further process the filtered parameters by categorizing each filtered parameter based on the content of the filtered parameter. For example, filtered parameter A may specify a virtual machine hosting data item A having undergone a reboot. Accordingly, filtered parameter A may be classified as an event (332) due to filtered parameter A specifying an occurrence. Filtered parameter C may specify a configuration of the backup storage device. Accordingly, filtered parameter C may be classified as a condition (334) for specifying a configuration. Filtered parameters E and F may specify a backup policy of an incremental backup for data items A and C, respectively. Accordingly, filtered parameters E and F may be classified as policies (326). The promotion parameter filter (320) may store the filtered parameters and the associated tags and parameter values in temporary storage (330) based on the classification [2].

The temporary storage may organize the filtered parameters based on the classification. The organization may include storing in logical data buckets for each class (i.e., a data bucket for events (332), a data bucket for conditions (334), a data bucket for policies (336)).

At a later point in time, a promotion parameter mapper (350) may perform the method of FIG. 2B to initiate a promotion parameter mapping based on a trigger event. The trigger event may be a periodic occurrence that triggers the promotion parameter mapper (350) to perform the promotion parameter mapping for data items A, B, and C [3]. The promotion parameter mapping may include calculating a data item value for each data item. The data item value may be calculated for a data item by obtaining filtered parameters associated with the data item and performing an "or" function on the parameter values of the obtained filtered parameters. For data item A, parameter A is a "true" value and parameter E is a "false" value; therefore, the data item value of data item A is "true." Similar for data items B and C, the corresponding data item values are calculated.

The promotion parameter mapper (350) may update a promotion parameter register (340) based on the data item values. The promotion parameter register (340) may include a number of data item bits each corresponding to a data item. The value of each data item bit may be updated with the data item value of the corresponding data item [4].

At a later point in time, a backup agent (360) may send a backup request to the promotion parameter mapper (350) that specifies performing an incremental backup of data items A, B, and C [5]. The promotion parameter mapper (350) may perform the method of FIG. 2C to promote data items A and B based the promotion parameter register (340) [6]. The promotion parameter mapper may send a notification to the backup agent (360) to promote data items A and B from an incremental to a full [7].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve a backup operation by identifying data items that are to be fully backed up as opposed to partially backed up. A data item that is partially backed up requires fewer computing resources to back up than the data item that is fully backed up.

A conventional method for backing up multiple data items may include identifying an event that may affect a backup operation of one or more data items and either: (i) promoting all data items to a full backup, even if a data item did not require a promotion, and wasting unnecessary computing resources fully backing up the additional data items, or (ii) not promoting any data items to a full backup and risking data loss or wasting computing resources by generating unusable partial backups. Because a backup agent performing the backup operation is unable to determine which data items are affected by the event, the backup agent may perform one of the two aforementioned options.

Embodiments of the invention improve the backup operation by introducing a backup utility that intelligently selects data items that are to be promoted using parameters associated with the data items.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing backups, the method comprising:
    obtaining a plurality of parameters for a data item,
        wherein a parameter in the plurality of parameters comprises at least one of an event, a condition, and a policy,
        wherein the event specifies an occurrence on the data item,
        wherein the condition specifies a configuration of the data item, and
        wherein the policy specifies a schedule for backing up the data item;
    filtering the plurality of parameters to obtain a plurality of filtered parameters;
    evaluating each filtered parameter of the plurality of filtered parameters to obtain a plurality of evaluated parameters;
    updating a promotion parameter register based on the plurality of evaluated parameters to obtain an updated promotion parameter register; and
    after updating the promotion parameter register:
        receiving a backup request;
        selecting a second data item from the backup request;
        identifying a data item bit index associated with the second data item in the updated promotion parameter register;
        making a determination that the data item bit index suggests a backup promotion for the second data item;
        in response to the determination, specifying that a full backup is to be performed on the second data item; and
        after the specifying, initiating the full backup on the second data item.

2. The method of claim 1, further comprising:
    after evaluating each filtered parameter of the filtered parameters to obtain a plurality of evaluated parameters, storing the plurality of evaluated parameters in a temporary storage.

3. The method of claim 2, where in the temporary storage is level 2 (L2) cache on a production host.

4. The method of claim 3, wherein the data item is located on the production host.

5. The method of claim 4, wherein the promotion parameter register is stored on the production host.

6. The method of claim 1, wherein updating a promotion parameter register comprises:
    modifying a bit in the promotion parameter register, wherein the bit corresponds to the data item.

7. The method of claim 1, wherein updating the promotion parameter register is performed in response to a trigger event.

8. A non-transitory computer readable medium comprising computer readable program code, which when executed by a computer processor enables the computer processor to perform a method for performing a backup operation, the method comprising:
    obtaining a plurality of parameters for a data item,
        wherein a parameter in the plurality of parameters comprises at least one of an event, a condition, and a policy,
        wherein the event specifies an occurrence on the data item,
        wherein the condition specifies a configuration of the data item, and
        wherein the policy specifies a schedule for backing up the data item;
    filtering the plurality of parameters to obtain a plurality of filtered parameters;
    evaluating each filtered parameter of the plurality of filtered parameters to obtain a plurality of evaluated parameters;
    updating a promotion parameter register based on the plurality of evaluated parameters to obtain an updated promotion parameter register; and
    after updating the promotion parameter register:
        receiving a backup request;
        selecting a second data item from the backup request;
        identifying a data item bit index associated with the second data item in the updated promotion parameter register;
        making a determination that the data item bit index suggests a backup promotion for the second data item;
        in response to the determination, specifying that a full backup is to be performed on the second data item; and
        after the specifying, initiating the full backup on the second data item.

9. The non-transitory computer readable medium of claim 8, the method further comprising:
    after evaluating each filtered parameter of the filtered parameters to obtain a plurality of evaluated parameters, storing the plurality of evaluated parameters in a temporary storage.

10. The non-transitory computer readable medium of claim 9, wherein the temporary storage is level 2 (L2) cache on a production host.

11. The non-transitory computer readable medium of claim 10, wherein the data item is located on the production host.

12. The non-transitory computer readable medium of claim 11, wherein the promotion parameter register is stored on the production host.

13. The non-transitory computer readable medium of claim 8, wherein updating a promotion parameter register comprises:
    modifying a bit in the promotion parameter register, wherein the bit corresponds to the data item.

14. The non-transitory computer readable medium of claim 8, wherein updating the promotion parameter register is performed in response to a trigger event.

15. A system, comprising:
    a processor;

memory comprising instructions, which when executed by the processor, perform a method, the method comprising:

obtaining a plurality of parameters for a data item, wherein a parameter in the plurality of parameters comprises at least one of an event, a condition, and a policy,
wherein the event specifies an occurrence on the data item,
wherein the condition specifies a configuration of the data item, and
wherein the policy specifies a schedule for backing up the data item;
filtering the plurality of parameters to obtain a plurality of filtered parameters;
evaluating each filtered parameter of the plurality of filtered parameters to obtain a plurality of evaluated parameters;
updating a promotion parameter register based on the plurality of evaluated parameters to obtain an updated promotion parameter register; and
after updating the promotion parameter register:
receiving a backup request;
selecting a second data item from the backup request;
identifying a data item bit index associated with the second data item in the updated promotion parameter register;
making a determination that the data item bit index suggests a backup promotion for the second data item;
in response to the determination, specifying that a full backup is to be performed on the second data item; and
after the specifying, initiating the full backup on the second data item.

16. The system of claim 15, the method further comprising:
after evaluating each filtered parameter of the filtered parameters to obtain a plurality of evaluated parameters, storing the plurality of evaluated parameters in a temporary storage.

17. The system of claim 16, wherein the temporary storage is level 2 (L2) cache on a production host.

18. The system of claim 17, wherein the data item is stored on the production host.

19. The system of claim 18, wherein the promotion parameter register is stored on the production host.

20. The system of claim 15, wherein updating a promotion parameter register comprises:
modifying a bit in the promotion parameter register, wherein the bit corresponds to the data item.

* * * * *